Oct. 31, 1939.  F. J. LOOMIS ET AL  2,178,208
PAD ROLLER
Original Filed Oct. 14, 1932
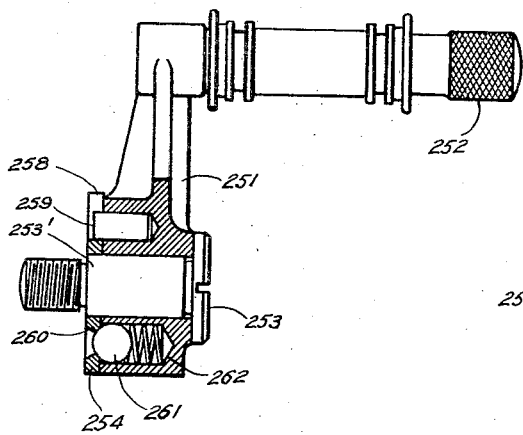
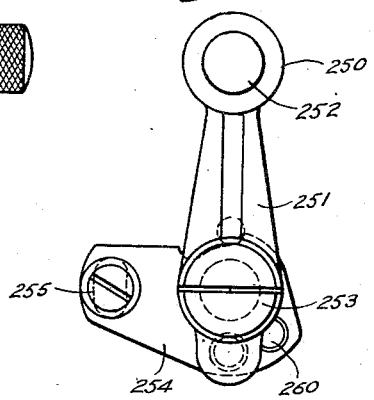
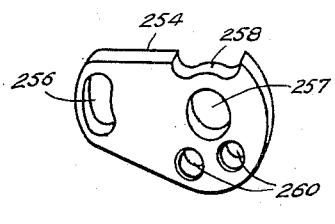
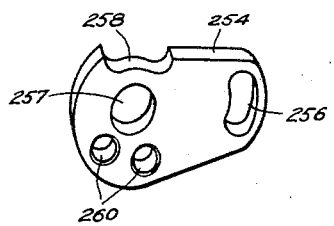
INVENTORS
FRED J. LOOMIS
ELWOOD W. REYNOLDS
BY
ATTORNEY.

Patented Oct. 31, 1939

2,178,208

UNITED STATES PATENT OFFICE 2,178,208

PAD ROLLER

Fred J. Loomis, Rochester, N. Y., and Elwood W. Reynolds, Westfield, N. J., assignors to Radio Corporation of America, a corporation of Delaware Original applications October 14, 1932, Serial No. 637,854; June 26, 1935, Serial No. 28,444; May 13, 1937, Serial No. 142,394. Divided and this applictaion August 31, 1938, Serial No. 227,830

2 Claims. (Cl. 271—2.3)

This invention relates to structure adapted for use in soundheads such as those adapted to be used in combination with motion picture apparatus for the purpose of producing talking motion pictures, and is a division of our applications No. 637,852, filed October 14,1932; No. 28,444, filed June 26, 1935; and No. 142,394, filed May 13, 1937. It will be apparent, however, that its utility is by no means limited to such use.

It has for many years been customary in the talking picture art to provide a sound reproducing mechanism commonly known as a soundhead which is adapted for attachment to a motion picture projector and which is provided with a drive mechanism common to both the soundhead and the projector so that a single film carrying both the picture and sound records can be run consecutively through the two instrumentalities and sound can be reproduced from the film in exact synchronism with the picture projected from the same film.

The soundhead ordinarily includes an exciter lamp, an optical system and a photoelectric cell, although any other desirable form of sound take-off may be used. The sound record moving mechanism may be mounted inside or exterior to the soundhead. Considerable difficulty has been encountered in the past due to the necessity for moving the film at an absolutely uniform speed past the sound reproduction point, the production of such uniform movement being rendered difficult because of the necessity of moving the film by means of sprockets cooperating with the sprocket holes therein, and because of irregularities in the operation of the driving mechanism and its attendant gearing.

The film is held upon the sprocket by what are known as "pad rollers".

It is necessary that these rollers should definitely maintain the film upon the sprockets, but, on the other hand, it is undesirable that they should touch the film except when necessary to perform their function. It is accordingly customary to adjust these rollers so that they are spaced from the surface of the sprocket about twice the thickness of the film. There is a possibility that splices may be even thicker than this, and it is therefore necessary to hold the pad rollers not only definitely but yieldably in this position.

It is further necessary that the rollers be instantly releasable for the purpose of threading the machine; and we accomplish all these results by the construction shown.

One object of the invention is the production of a soundhead which is adapted to cooperate with the standard types of motion picture apparatus and which is capable of such an extremely accurate movement of the film that a high degree of fidelity of the reproduced sound is realized.

Another object of the invention is the production of such a soundhead having greatest possible simplicity and lowest production cost.

Another object of the invention is the production of a soundhead which will permit large manufacturing tolerances and at the same time produce a device having an extremely high degree of precision.

Another object of the invention is to provide an improved pad roller for retaining the film upon the driving sprockets which is held definitely in position but which is easily adjustable.

Another object of the invention is to provide improved pad rollers and means of adjustment therefor for retaining the film upon the sprockets.

In the drawing:

Figure 1 is a side view of the improved pad roller assembly,

Figure 2 is an end view thereof, and

Figures 3 and 4 are views of opposite sides of the stop-plate.

The roller itself is indicated at 250, in Figs. 1 and 2 and is freely rotatable upon a shaft fixed in the movable arm 251 and carrying the knurled knob 252 at its outer end. The arm 251 is pivoted upon the shouldered screw 253, which is fitted into the center plate of the machine, the shoulder 253' fitting against the center plate and establishing proper clearance beneath the head of the screw for free motion of the arm 251.

The plate 254 lies between the arm 251 and the center plate, and is held against rotation about the screw 253, which passes through the hole 257 (Figs. 3 and 4) by the screw 255 which passes through the slot 256. The slot 256 is arcuate in shape, and the plate 254 may be angularly adjusted by a corresponding amount about the screw 253.

As shown in Figs. 3 and 4, both sides of the plate 254 are alike, so that it may be used either "right-handed" or "left-handed", as rendered desirable by the location of surrounding parts.

The extreme limits of motion of the arm 251 are determined by the ends of the arcuate recess 258 into which the round pin 259 fits, the pin 259 being a "force fit" in a hole in the arm 251.

The arm is held at either end of its travel by the ball 261 and the coil spring 262. The plate 254 is provided with holes 260 into which the coil spring tends to force the ball, but these holes are so located that when the pin 259 is at either end of its travel in the recess 258 the ball 261 is not quite seated in the corresponding hole, and the arm is thereby held firmly in position.

Since the holding, locating, and adjusting means just described function equally well at either end of the travel of the arm 251, either end may be used as the sprocket position; and in addition the plate 254 is reversible as before described.

Having now described our invention, we claim:

1. A pad roller assembly comprising a pivot member, a stop plate, an arm for supporting the pad roller pivoted upon the said pivot member, stop means integral with the said arm and adapted to cooperate with the said stop plate, and latching means in combination with the said arm and adapted to cooperate with the said stop plate.

2. A stop plate for a pad roller assembly comprising a single piece of material having an aperture adapted to fit upon the pivot member on the pad roller assembly, an arcuate slot adapted to receive a fastening screw for adjusting the stop plate about the said pivot member, and a recess in one edge of the said stop plate for cooperating with a member on the pad roller arm.

FRED J. LOOMIS.
ELWOOD W. REYNOLDS.